US006178193B1

(12) United States Patent
Kondo

(10) Patent No.: US 6,178,193 B1
(45) Date of Patent: Jan. 23, 2001

(54) SPREAD SPECTRUM RECEIVER AND TRANSMISSION POWER CONTROL METHOD

(75) Inventor: Takayuki Kondo, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/090,873

(22) Filed: Jun. 5, 1998

(30) Foreign Application Priority Data

Jun. 11, 1997 (JP) ................................................ 9-152735

(51) Int. Cl.[7] .................................................. H04L 27/30
(52) U.S. Cl. .......................... 375/130; 375/134; 375/136; 375/142; 375/145; 455/522
(58) Field of Search ..................................... 375/130, 134, 375/136, 137, 142, 145, 147, 149, 150, 354; 370/515, 342; 455/522

(56) References Cited

U.S. PATENT DOCUMENTS 5,361,276 * 11/1994 Subramanian ............................ 375/1
5,629,639 * 5/1997 Williams ................................. 327/60
5,644,591 * 7/1997 Sutton ................................... 375/200

FOREIGN PATENT DOCUMENTS 07202843    8/1995 (JP).

* cited by examiner

Primary Examiner—Stephen Chin
Assistant Examiner—Mohammad Ghayour
(74) Attorney, Agent, or Firm—McGuireWoods LLP

(57) ABSTRACT

In a spread spectrum receiver, when a preliminarily set integration period for integrating a correlated power of a received signal is significantly offset with respect to a fading period, accurate follow-up of a path becomes difficult to lower synchronization acquisition ability. To avoid this, in a fading period computing unit, an offset of the transmission power is obtained from a transmission power control information extracted by a decoder, correlated power calculation is performed for deriving the fading period on the basis of the result of the correlated power calculation. According to this fading period, the integrated period is determined to accurately perform synchronization acquisition by performing integration of the correlated power depending upon the fading period.

22 Claims, 11 Drawing Sheets

FIG. 4
RECEPTION POWER LEVEL VARIATION UNDER NO FADING
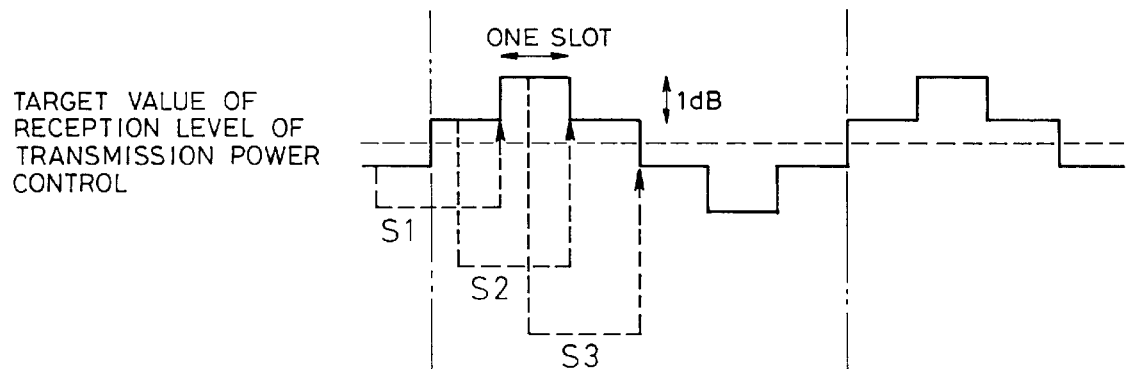
TRANSMISSION POWER LEVEL VARIATION UNDER NO FADING
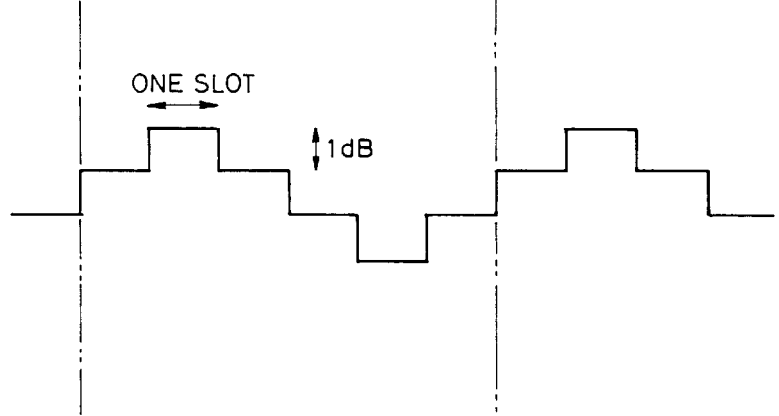
RELATIVE TRANSMISSION LEVEL VARIATION BY TRANSMISSION POWER CONTROL INFORMATION UNDER NO FADING
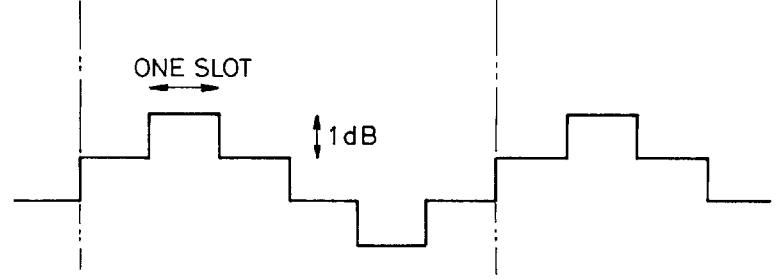

FADING OF PROPAGATION PATH IN THE CASE OF TOO FADING
PERIOD TO PERMIT FOLLOWING-UP TRANSMISSION POWER CONTROL

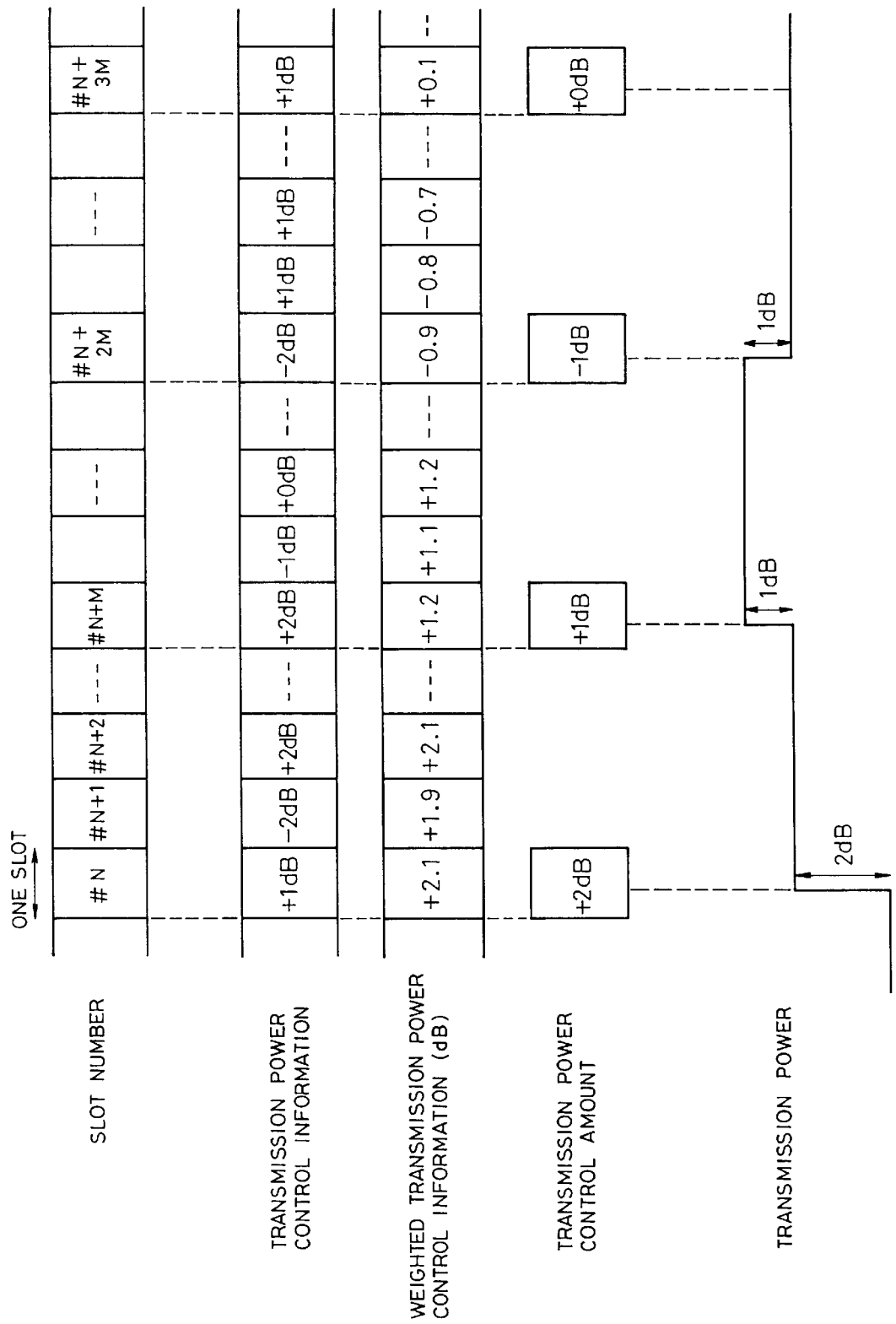

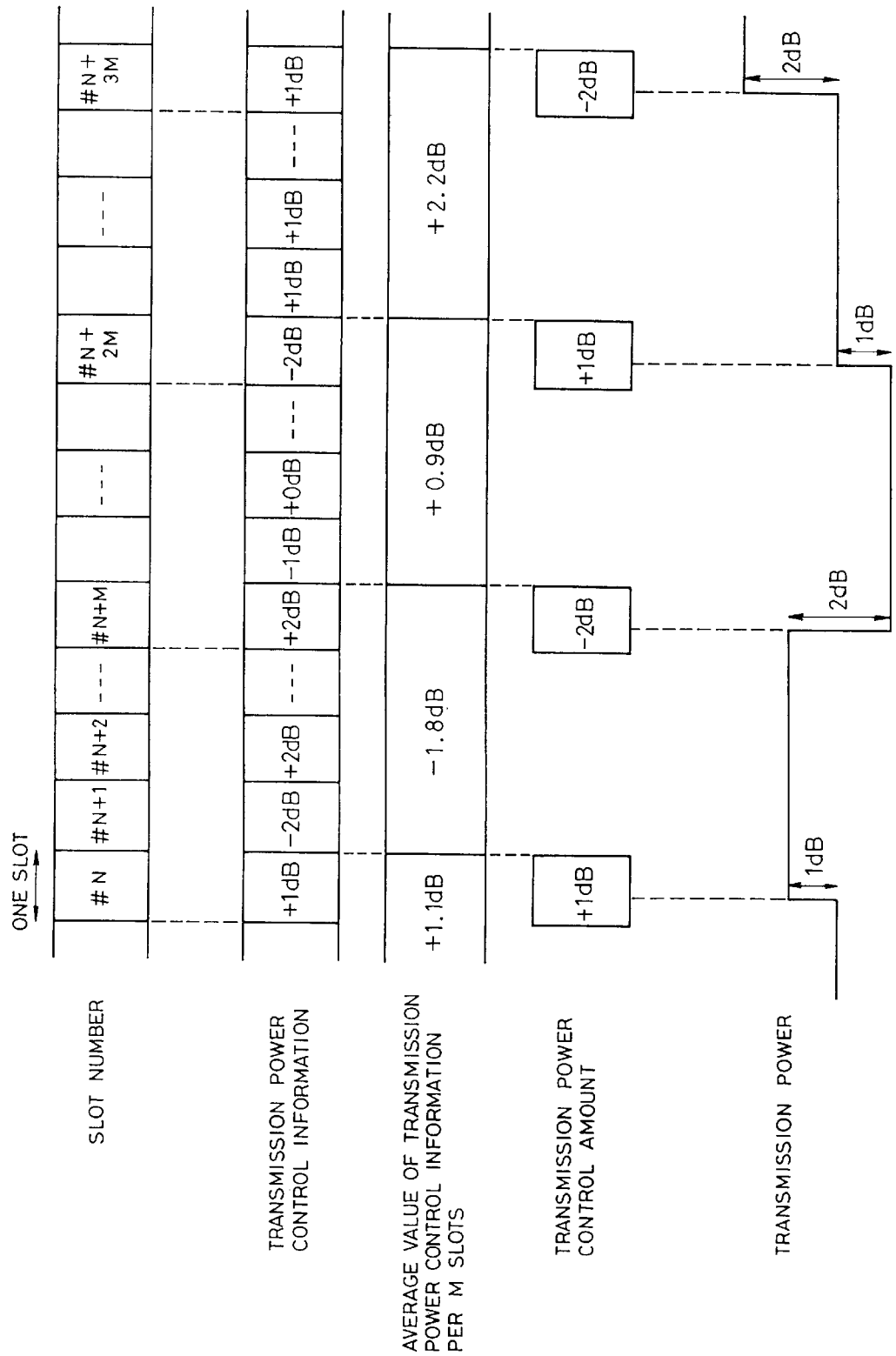

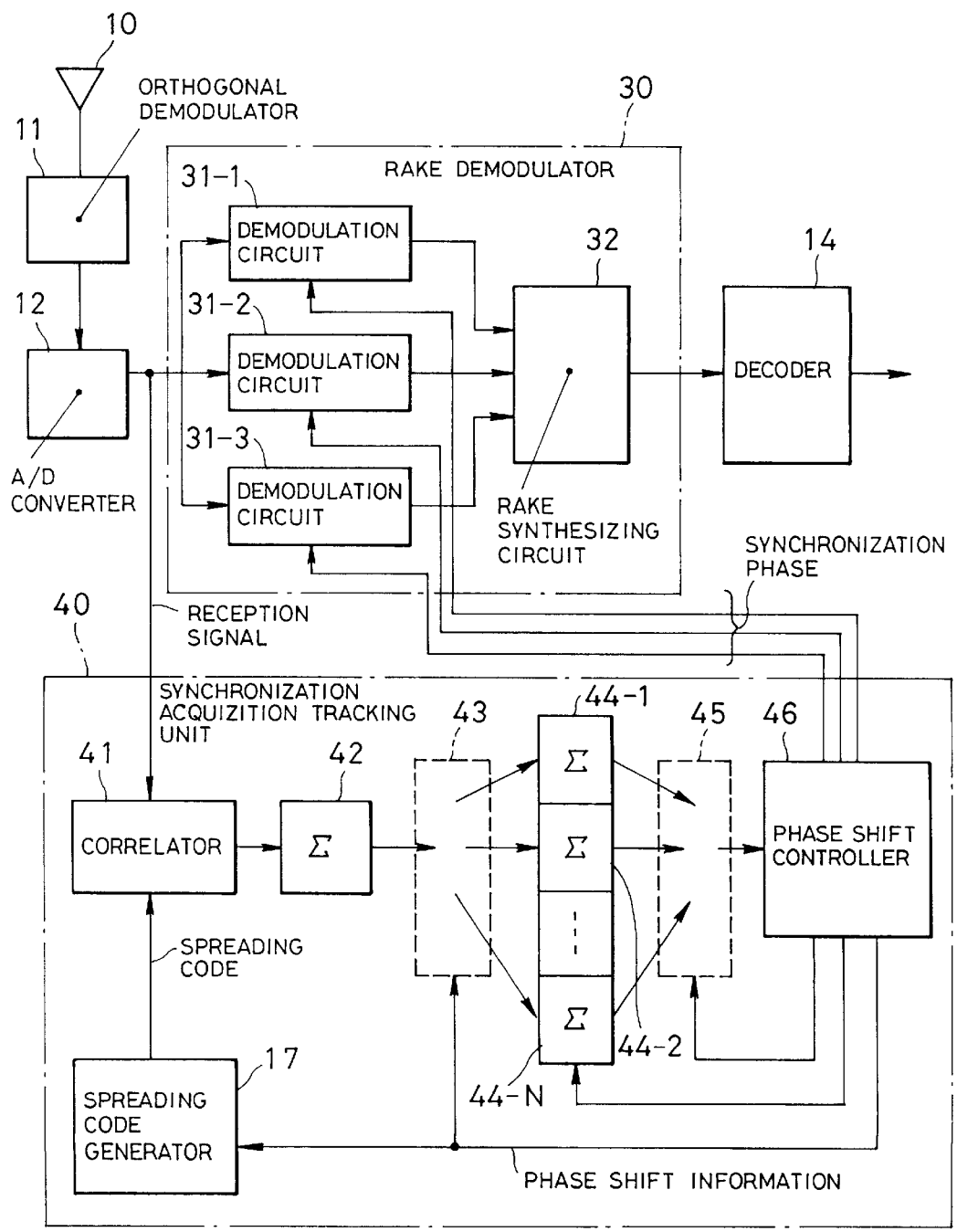

SPREAD SPECTRUM RECEIVER AND TRANSMISSION POWER CONTROL METHOD

BACKGROUND OF THE INVENTION

1. Field of the Invention

The present invention relates generally to a spread spectrum receiver. More specifically, the invention relates to a fading period detecting system for a synchronization acquisition and a transmission power control.

2. Description of the Related Art

In a multiple access system for mutual communication between a plurality of stations utilizing assigned frequency band, there has been proposed various communication systems, such as a frequency division multiple access (FDMA) system, a time division multiple access (TDMA) system, code division multiple access (CDMA) system and so forth. In most of these systems, a base station is arranged in each of cells which is established by dividing a service area into small areas, and a subscriber terminal communicates with another subscriber terminal via the base station.

Amongst, the CDMA system which does not require burst synchronization, is suitable for a communication system having a large number of subscribers and is strong against interference and jamming. Therefore, the CDMA system has been attracting attention. The CDMA system employing a spread spectrum communication system is a multiple access system assigning mutually distinct spreading code series for respective users and performing spread modulation utilizing the same. Accordingly, even in one cell, the same frequency can be used by a plurality of users.

As is well known, the spread spectrum communication system is premised to use a spreading code synchronized with the spreading code used at the transmission side in demodulation by despreading of a reception signal. For example, when the diffusion signal is shifted over one chip due to influence of variation of propagation path delay or so forth due to multiple path or so forth, it becomes difficult to accurately demodulate data. Therefore, a technology for synchronization acquisition (initial synchronization) for reducing a phase difference of transmission side and reception side spreading code series (normally, less than or equal to half chip) and synchronization tracking (synchronization holding) for maintaining a necessary chip accuracy so as not to lose track of the once acquisited synchronization position due to influence of noise or demodulation, are indispensable.

Conventionally, this kind of synchronization acquisition circuit is employed for the purpose of acquisition of chip phase synchronization of the spreading code in the spread spectrum receiver, as disclosed in Japanese Unexamined Patent Publication No. Heisei 7-202843, for example.

FIG. 11 is a block diagram showing one example of the conventional spread spectrum receiver and its synchronization acquisition circuit. As shown in FIG. 11, the conventional spread spectrum receiver has an orthogonal demodulator 11 connected to a reception antenna 10, an A/D converter 12 for performing analog-to-digital conversion of an output of the orthogonal demodulator 11, a RAKE demodulator 30 connected to an output of the A/D converter 12, a synchronization acquisition tracking unit 40 similarly connected to the output of the A/D converter 12 and a decoder 14 connected to the output of the RAKE demodulator 30.

The RAKE demodulator 30 performs maximum ratio synthesis of upper three outputs in the order of electric power among correlated demodulation output. Each correlated demodulation output by each of three demodulation circuits 31-1 to 31-3 which perform correlated demodulation on the basis of phase information obtained from the synchronization acquisition tracking unit, is output with synthesis by a RAKE synthesizing circuit 32.

In the synchronization acquisition tracking unit 40, a correlated power is calculated by a correlator 41. The correlated power is integrated by an integrator 42. An integrated output of the integrator 42 is sequentially switched by a switch 43 at a period Tr (about Tw/100) which is sufficiently shorter than a Rayleigh fading period Tw (about several Hz to 100 Hz). The correlated power integrated by each of these periods are integrated by inputting to N in number of integrators 44-1 to 44-N. Then at a timing where a preliminarily designated fixed integration period is reached, a switch 45 is switched for outputting phase shifting amounts corresponding to integrators among the integrators 44-1 to 44-N outputting largest three integrated values. In a manner set forth above, synchronization acquisition is performed.

A problem encountered in the prior art set forth above is that the predeterminarily designated and fixed integration period does not match with an actual fading period. If the set fixed integration period is short, when the fading period is long, it is possible to perform integration for a falling down portion of fading. On the other hand, if the set integration period is long, when the fading period is short, integration can be performed for unnecessarily long period to slow-down follow-up of the path and whereby to cause degradation of synchronization acquisition ability.

The reason is that since the fading frequency is sequentially varied depending upon moving speed of a mobile terminal, an integration period of an optimal correlated value cannot be obtained.

SUMMARY OF THE INVENTION

An object of the present invention is to provide a spread spectrum receiver which can improve reception characteristics by enabling obtaining of an integration period of an optimal correlated value even upon variation of fading period.

According to one aspect of the present invention, a spread spectrum receiver for receiving a spread spectrum signal and demodulating the received signal on the basis of a synchronization phase detected by despreading of the received signal, comprises:

correlation computing means for controlling a phase of a spreading code over a search range and deriving correlation between the received signal and the spreading code;

integrating means for integrating correlation outputs of the correlation computing means in each phase condition of the spreading code over an integration period;

peak detecting means for deriving a synchronization phase by detecting a peak path from output of the integrating means;

demodulation means for demodulating the received signal according to the synchronization phase;

fading period computing means for deriving a relative transmission power on the basis of a transmission power offset with extracting a transmission power control information of a predetermined period transmitted from a counterpart for controlling a transmission power and deriving the integration period depending upon the relative transmission power; and transmission means for deriving the transmission power according to the transmission power information and transmitting the derived transmission power.

According to another aspect of the present invention, a transmission power control method in a spread spectrum receiver for receiving a spread spectrum signal and demodulating the received signal on the basis of a synchronization phase detected by despreading of the received signal, comprises:

correlation computing step of controlling a phase of a spreading code over a search range and deriving correlation between the received signal and the spreading code;

integrating step of integrating correlation outputs of the correlation computing step in each phase condition of the spreading code over an integration period;

peak detecting step of deriving a synchronization phase by detecting a peak path from output of the integrating step;

demodulating step of demodulating the received signal according to the synchronization phase;

fading period computing step of deriving a relative transmission power on the basis of a transmission power offset with extracting a transmission power control information of a predetermined period transmitted from a counterpart for controlling a transmission power and deriving the integration period depending upon the relative transmission power; and transmitting step of deriving the transmission power according to the transmission power information and transmitting the derived transmission power.

The present invention constructed as set forth above improves peak detecting characteristics in consideration of influence of fading by deriving relative transmission power from the transmission power offset contained in the transmission power control information and by integrating the profile of the correlation level of the search range over the integration period corresponding to the fading period. When the transmission power control cannot follow-up the fading period, updating of the instantaneous transmission power is disabled to moderately update the transmission power to avoid degradation of transmission power control characteristics.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 4 is a timing chart showing an example of operation of the preferred embodiment of the spread spectrum receiver according to the present invention;

FIG. 9 is an illustration showing an operation of the case where blocks in FIG. 8 are employed;

FIG. 10 is an illustration showing an operation of a still further embodiment of the spread spectrum receiver according to the present invention; and FIG. 11 is a block diagram showing an example of the conventional spread spectrum receiver.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
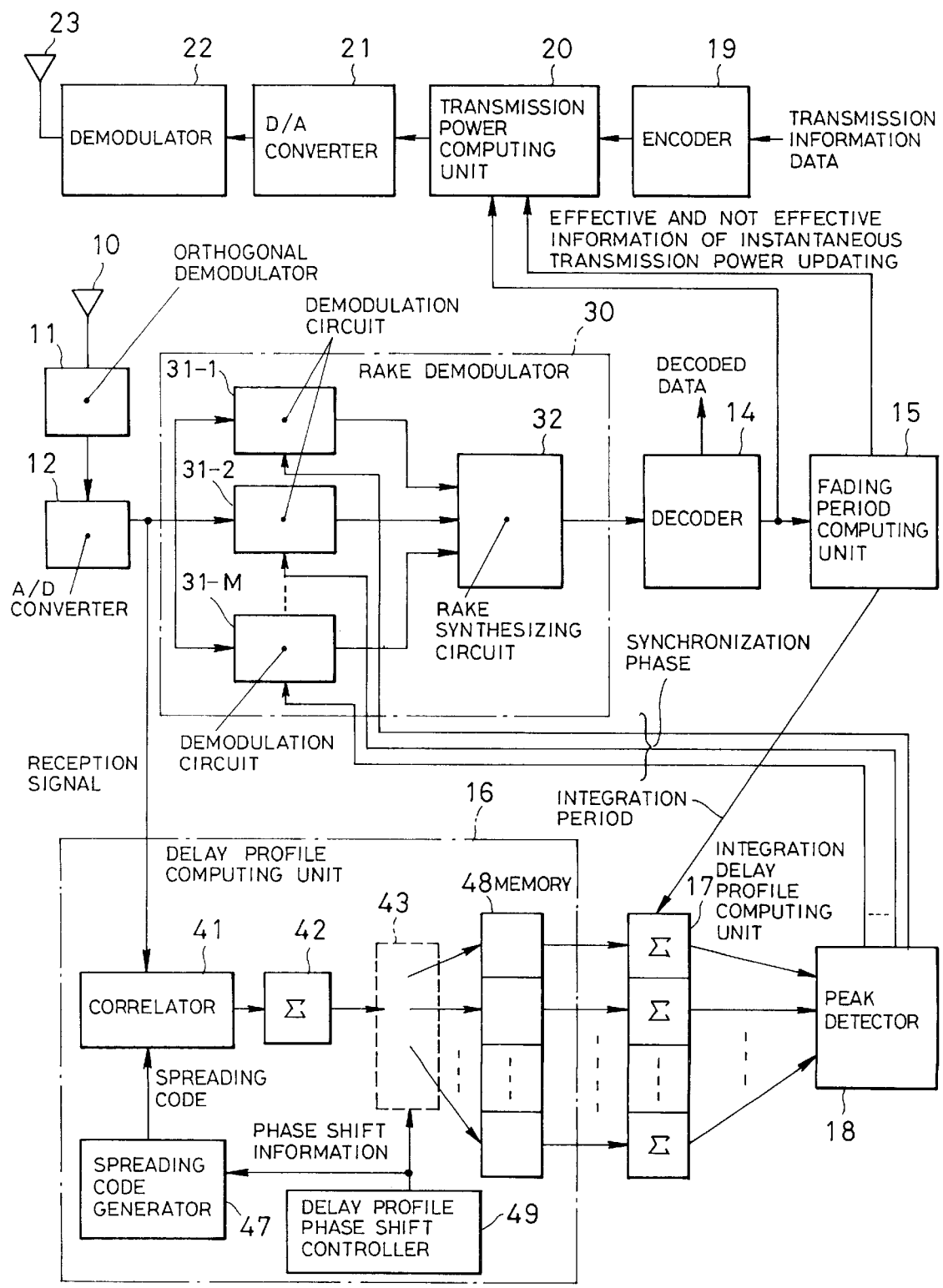
FIG. 1 is a block diagram of the preferred embodiment of a spread spectrum receiver according to the present invention.

FIG. 1 is a block diagram of the preferred embodiment of a spread spectrum receiver according to the present invention. In the following disclosure, like units to those in FIG. 11 will be represented by like reference numerals. Referring to FIG. 1, the preferred embodiment of the spread spectrum receiver according to the present invention includes the orthogonal demodulator 11 connected to the antenna 10, the A/D converter 12 performing A/D conversion of the output of the orthogonal demodulator 11, the RAKE demodulator 30 obtaining a synchronization phase from a peak detector 18, performing despreading, detecting and RAKE synthesis for outputting a demodulated data, a delay profile computing unit 16 connected to an output of the A/D converter and computing a correlation level of a search area, and the decoder 14 connected to the RAKE demodulator 30, generating a decoding data by decoding a demodulated data and extracting a transmission power control information contained in the decoded data.

Also, the shown embodiment of the spread spectrum receiver according to the invention includes a fading period computing unit 15 connected to an output of the decoder 14 and deriving a fading period and effective or not effective of updating of an instantaneous transmission power on the basis of a transmission power control information, an integration delay profile computing unit 17 connected to an output of the delay profile computing unit 16 and deriving an integration delay profile by integrating the delay profile over an integration period, and a peak detector 18 connected to an output of the integration delay profile computing unit 17 and detecting a peak to be taken as a synchronization phase of despreading of the RAKE demodulator 30 using the integration delay profile.

Furthermore, the shown embodiment of the spread spectrum receiver according to the invention includes an encoder 19 for encoding a transmission information data, a transmission power computing unit 20 connected to an output of the encoder 19 and deriving a transmission power on the basis of the transmission power control information and information concerning effective or not effective of updating of the instantaneous transmission power, a digital-to-analog (D/A) converter 21 connected to an output of the transmission power computing unit 20 and covering a digital signal output from the output of the transmission power computing unit 20 into an analog signal, a modulator 22 connected to an output of the D/A converter 21 and modulating the analog signal into a transmission frequency and a transmission antenna 23 for transmitting an output signal of the modulator 22.

The delay profile computing unit 16 is constructed with a phase shifter 49 for a delay profile, a spreading code generator 47, a correlator 41, an integrator 42, a switch 43 and a memory 48.

In the delay profile computing unit 16, a spreading code shifted a phase corresponding to a phase shifting amount, is generated by a spreading code generator 47. Then, a correlated power is calculated by the correlator 41. Then, the correlated power is integrated by the integrator 42. Thus, the phase shifting amount is periodically updated by the phase shifter 49. Then, the connection between the integrator 42 and the memory 48 is switched by the switch 43 according to the phase shifting amount, and the delay profile data is periodically stored in the memory.

The integrated delay profile computing unit 17 is constructed with a plurality of memories with integrating function. The delay profile computing unit 17 integrates an output value from the memory 48 storing the delay profile data and a value of the memory of the integrated delay profile computing unit 17 over a period noticed by the fading period computing unit to store the result of integration in a memory.

The peak detector 18 is connected to each memory of the integrated delay profile computing unit 17, detects largest M in number of integrated delay profiles and outputs the detected M in number of integrated delay profiles to the RAKE demodulator 30. The peak detector 18 derives the phase shifting amounts of the largest M in number of integrated delay profiles among the integrated delay profile integrated over the integration for notifying these phase shifting amount of largest M in number of integrated values to the RAKE demodulator 30 as synchronization phase.

The RAKE demodulator 30 has the same construction as the prior art shown in FIG. 11. In the shown embodiment, M in number of demodulation circuit (31-1 to 31-M) are provided. The RAKE demodulator 30 performs maximum ratio synthesis of the upper M in number of correlated demodulation power in the order of electric power. Each correlated demodulation output by each of the M in number of correlated demodulation circuits 31-1 to 31-M which perform correlated demodulation on the basis of the synchronization phase obtained from the peak detector 18, is synthesized and output. Here, number M may be sufficient at about eight.

Figure 2:
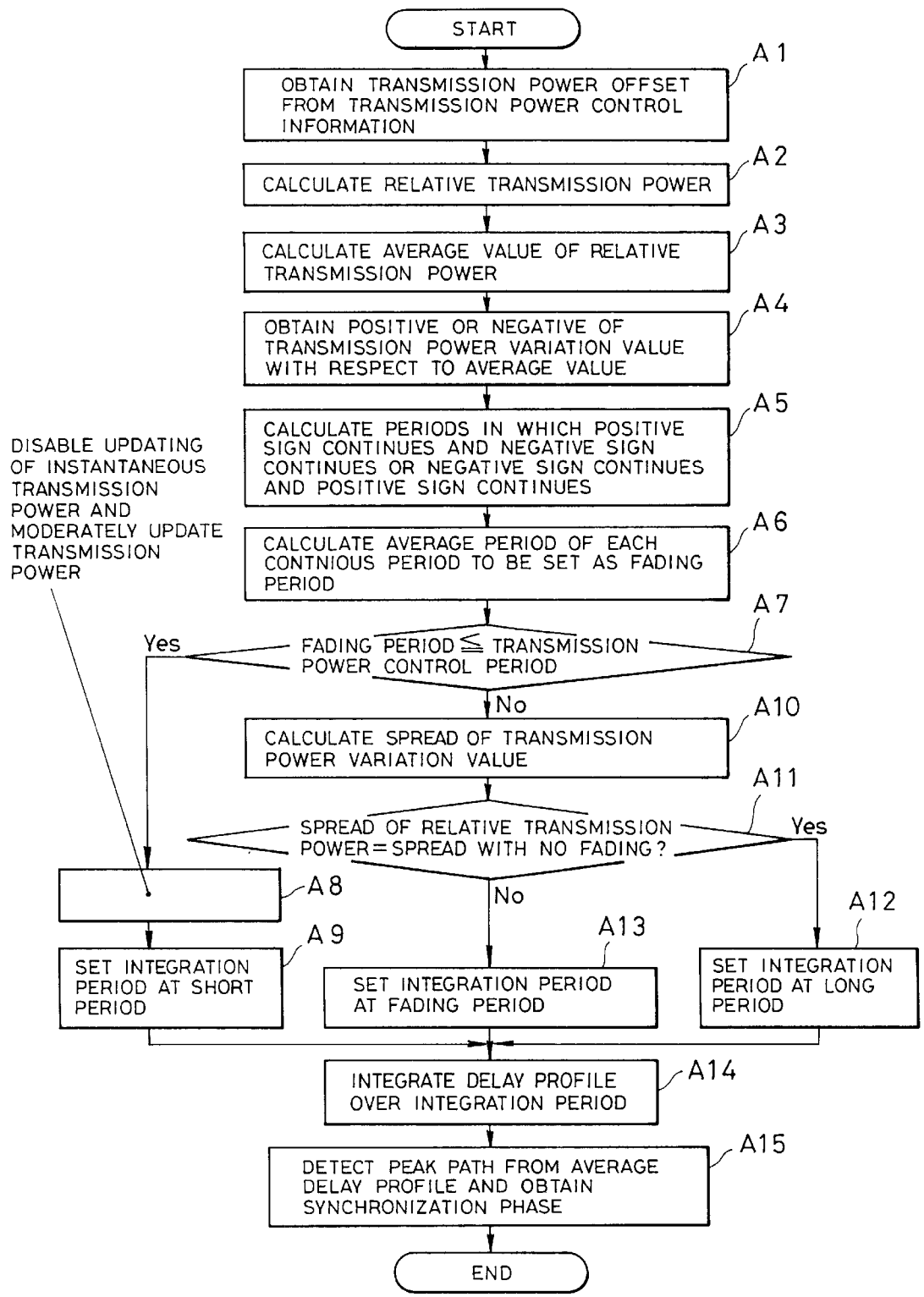
FIG. 2 is a flowchart showing an operation of the blocks in FIG. 1.

FIG. 2 is a flowchart showing an operation of the preferred embodiment of the spread spectrum receiver according to the present invention. The operation of the shown embodiment of the spread spectrum receiver of FIG. 1 will be discussed with reference to FIG. 2.

The decoder 14 codes the transmission control information transmitted from the call counterpart. The fading period computing unit 15 derives a transmission power offset of the transmission power control information (step A1), derives a relative transmission power on the basis of the transmission power offset (step A2), and derives an average value of the transmission power at a period corresponding to a sufficiently long fading period (step A3). Also, the sign (positive or negative) of the relative transmission power relative to the average value of the relative transmission power (step A4), periods, in which positive signs are continued and negative signs are continued or in which negative signs are continued and positive signs are continued, is derived (step A5), for deriving the average value of each period.

Also, the average value is taken as the fading period (step A6). When the fading period is short and close to a transmission power control period (step A7), judgment is made that the transmission power control cannot follow-up to make instantaneous updating of the transmission power null (step A8) and then, the integration period is made shorter (step A9). For example, the integration period set at a period corresponding to a period (0.625 ms) of about one slot. If the answer at step A7 is negative (NO), a spread of the relative transmission power is derived (step A10).

If spread of the relative transmission power is close to the spread value in the steady state (step A11), judgment is made that fading is not caused to set the integration period at a period sufficiently longer than the transmission power control period (step A12). If the fading period is sufficiently longer the transmission power control period (step A7), when the spread of the relative transmission power is greater than the spread value of the case where no fading is caused (step A11), the fading period is set as the integration period (step A13).

The integrated delay profile computing unit 17 integrates the delay profile over an integration period obtained from the fading period computing unit 15 (step A14). The peak detector 18 derives a plurality of synchronization phases corresponding to detection of a plurality of peak paths from the integrated delay profile (step A15).

In the RAKE demodulator 30, reception signals of a plurality of paths are demodulated on the basis of synchronization phases of a plurality of peak paths derived by the peak detector 18. The transmission power computing unit 20 controls the transmission power for making updating of the transmission power moderate when the instantaneous updating of the transmission power is null (step A8).

Figure 3:
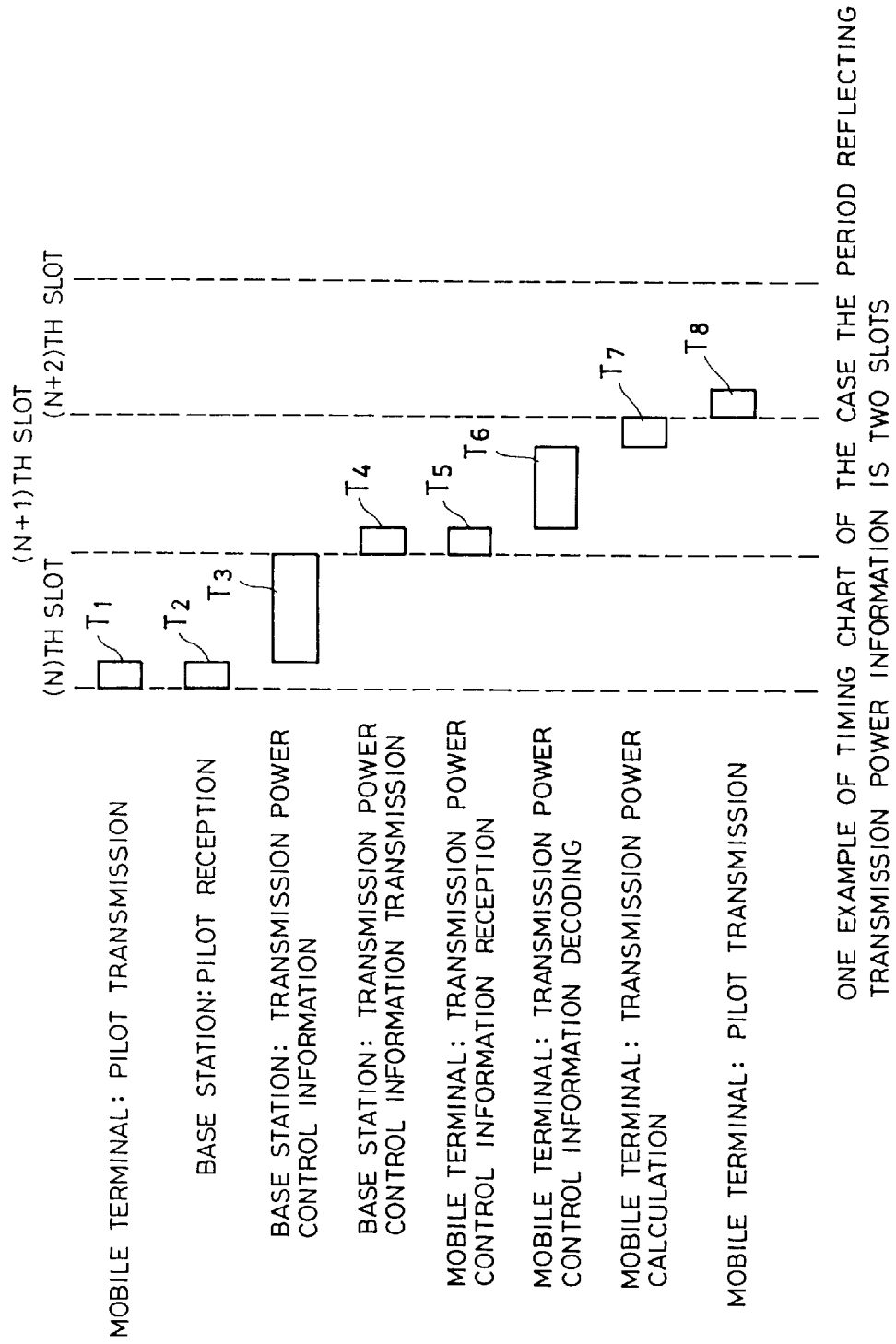
FIG. 3 is a timing chart showing an example of operation of the preferred embodiment of the spread spectrum receiver according to the present invention.

Referring to FIGS. 3 and 4, operation where no fading is caused will be discussed. FIG. 3 shows one example of the transmission power control. In the shown example, the slot, in which the transmission power control information is reflected is the slot of two slots later.

The mobile terminal transmits a pilot portion at a (N)th slot (T1 of FIG. 3). The base station receives the pilot portion at the (N)th slot, similarly (T2 of FIG. 3). After reception, the transmission power control information is calculated on the basis of the pilot reception level and a target reception level. For example, when the pilot reception level is smaller than the target reception level, the transmission power is elevated for 1 dB, and when the pilot reception level is greater than the target reception level, the transmission power is lowered for 1 dB (T3 of FIG. 3).

The base station transmits the transmission power control information with (N+1)th slot (T4 of FIG. 3). The mobile terminal receives the transmission power control information portion at the (N+1)th slot (T5 of FIG. 3). After reception, the transmission power control information is decoded (T6 of FIG. 3). After decoding, the transmission power is calculated. If the content of the transmission power control information is to rise 1 dB, the transmission power is set at a value 1 dB risen from the transmission power of the preceding slot. On the other hand, if the content of the transmission power control information is to lower 1 dB, the transmission power is set at a value derived by subtracting 1 dB from the transmission power of the preceding slot (T7 of FIG. 3). The mobile terminal transmits the transmission power reflecting the transmission power control information at (N+2)th slot (T8 of FIG. 3).

Referring to FIG. 4, there is illustrated one example of the relative transmission power level on the basis of the reception power level, the transmission power level and the transmission power control information in the case where no fading is caused.

The reception level repeats rising and lowering in stepwise fashion at six slots period as centered at the target value of the reception level as shown. This is because that the transmission power control information is reflected at two slot later. For example, by transmitting the transmission power control information rising the transmission power for 1 dB, the reception level is risen for 1 dB after two slots, at S1. At S2, since the reception level is greater than the target reception level, the transmission power control information for lowering the transmission power for 1 dB is transmitted, for example, to lower the reception level for 1 dB at two slots later. S3 becomes similar to S2.

The transmission power level and the relative transmission power level based on the transmission power control information also repeats rising and lowering in the stepwise fashion at six slots period, similar to the reception level. Due to the property set forth above, when a method for deriving the fading period according to the present invention is employed, judgement can be made that fading is caused in the six slots period (step A6).

However, when the spread of the relative transmission power is derived on the basis of the transmission power control information, the spread becomes small value in the extent of about 1 dB. In the shown example in FIG. 4, the spread is about 0.94 dB. When the fading is caused, the spread of the relative transmission power depending upon the transmission power control information becomes a large value, the spread value is the spread value in the case where the fading is not caused, e.g. about 1 dB, judgment is made that fading is not caused. The no fading is caused means that no relative variation of the positional relationship between the transmission and reception sides. The integration period is set to be a period sufficiently long in the extent that the accuracy of the integration profile becomes sufficiently good. (steps A11, A12).

Figure 5:
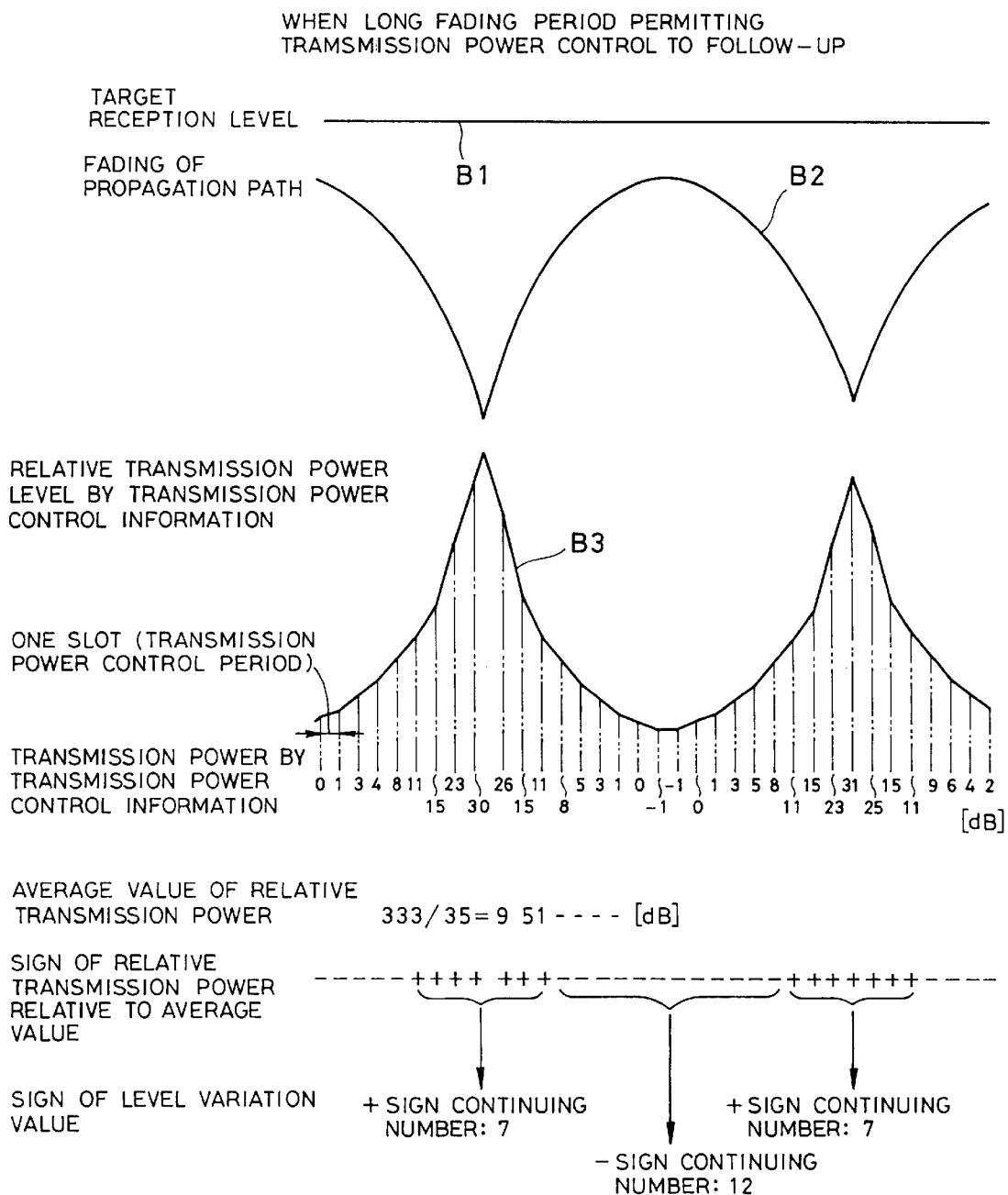
FIG. 5 is a timing chart showing an example of operation of the preferred embodiment of the spread spectrum receiver according to the present invention.

Referring to FIG. 5, operation in the case where the fading period is sufficiently long where the transmission power control can substantially follow-up the fading.

As shown in FIG. 5, since the target reception level becomes a certain particular value B1 of long period, when fading is caused as illustrated by B2, the relative transmission power based on the transmission power control information becomes as shown by B3. For example, an average value of the relative transmission power based on the transmission power control information by a sample of the period shown in FIG. 5 is calculated (step A3). In this case, the average value becomes about 9.5.

Next, a sign of the relative transmission power based on the transmission power control information in reference to the average value is detected (step A4). Continuing number of positive sign and continuing number of negative sign or continuing number of negative sign and continuing number of positive sign are derived. Since the leading end portion and the trailing end portion of the continuing signs are in transition portions, the signs next to the transition portions are taken as effective signs. In this case, seven positive signs are continued and twelve negative signs are continued, and then seven positive signs are continued.

In this example, effective sample of the continuing of the positive sign and continuing of the negative sign is one, an average of the period of the continuing positive and negative signs becomes (7+12)/1=19. In this example, since 1 slot is 1 ms, the fading period is derived as 19 ms. By converting the fading period into fading frequency, the fading frequency becomes about 52.6 Hz (step A6).

In actual case, the period for deriving the fading frequency is set to be about double of the fading period so that the fading frequency can be satisfactorily derived even at low frequency. For example, when fading frequency is derived down to 10 Hz, the fading period becomes about 200 ms.

In case of the long fading period where the transmission power control can substantially follow-up to the fading, the spread of the relative transmission power based on the transmission power control information becomes about 82.94 dB to be greater than the case where no fading is caused (steps A10 and A11). In this case, as the fading period has been measured, the fading period is taken as the integration period for deriving the integration delay profile (step A13).

Figure 6:
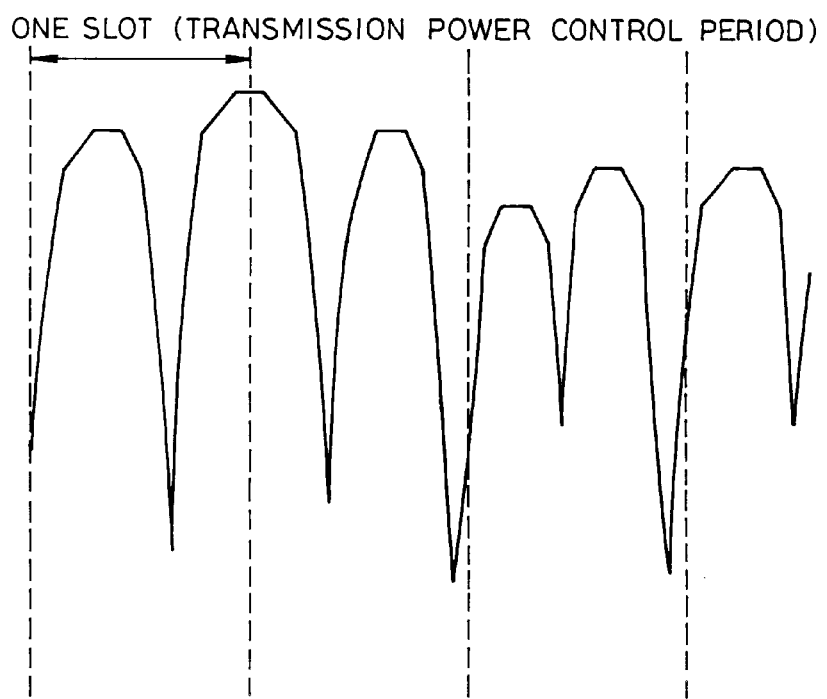
FIG. 6 is an illustration showing a fading of a propagation path in a case of a short fading period which a transmission power control cannot follow-up.

Referring to FIG. 6, the operation in the case of a short fading, in which the transmission power control cannot follow-up the fading, will be discussed.

When the fading period is shorter than the period controllable by the transmission power control, the fading period to be derived becomes substantially equal to the transmission power control period. Therefore, judgement is made that control per transmission power control period is not effective to perform updating of the transmission power moderately so that the average reception level becomes close to the target value of the reception level (step A8). On the other hand, since the fading period is too short to follow-up by the transmission power control, the integration period for deriving the integrated delay profile is set at short period (step A9).

In the foregoing embodiment, the transmission power computing unit 20 controls the transmission power to moderately update the transmission power when updating of the instantaneous transmission power is not effective (step A8 of FIG. 2), it is possible to take a method not to perform transmission power control or a method to thin the control slots.

Figure 7:
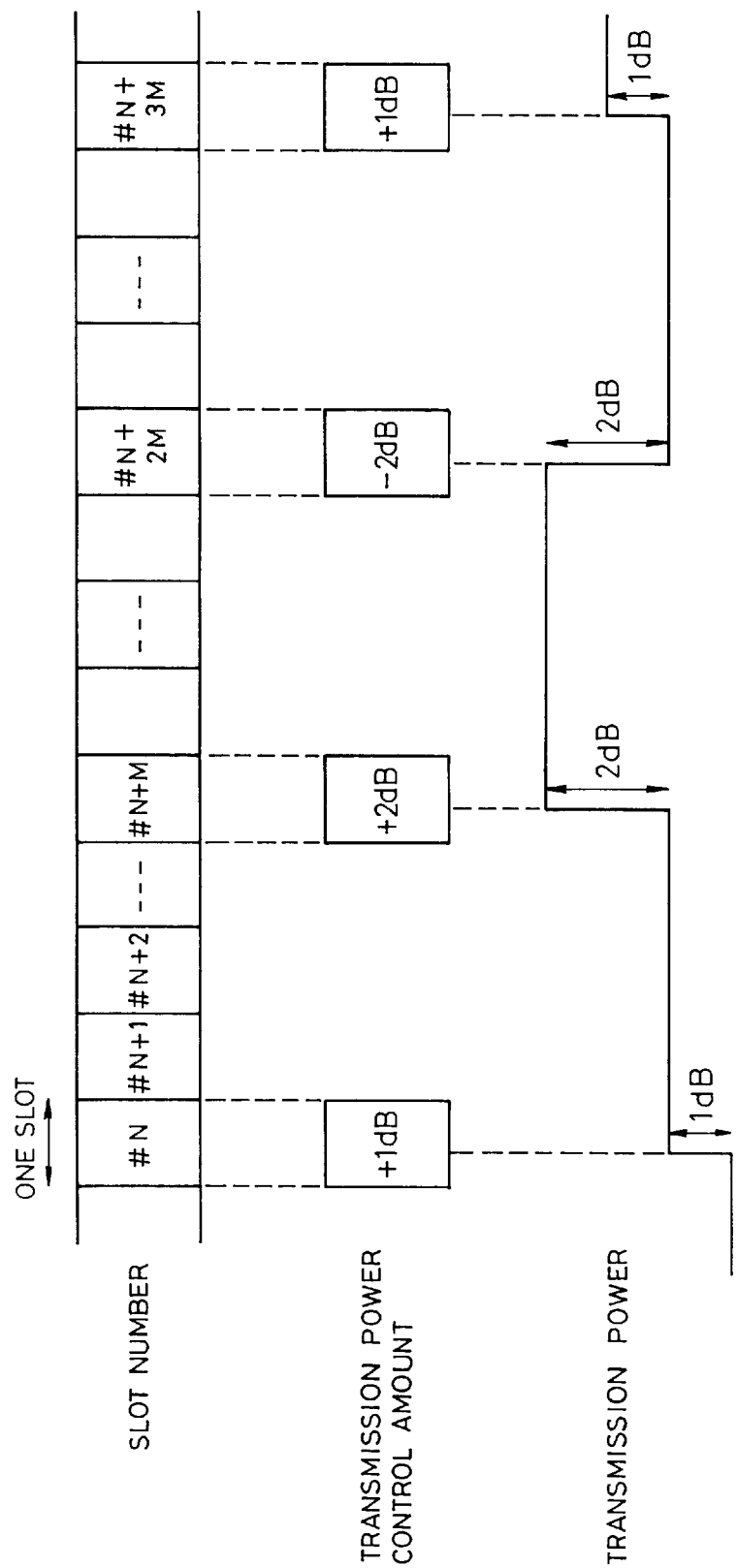
FIG. 7 is an illustration showing an operation of another embodiment of the spread spectrum receiver according to the present invention.

On the other hand, as another method, as shown in FIG. 7, a method to periodically input the transmission power control information at a period (for M slots) sufficiently longer than the transmission power control period, to update the transmission power, can be employed.

As a further method, by calculating the transmission power control information over the past period with weighting to update the transmission power. In this case, greater weight is given for the current transmission power control information.

Figure 8:
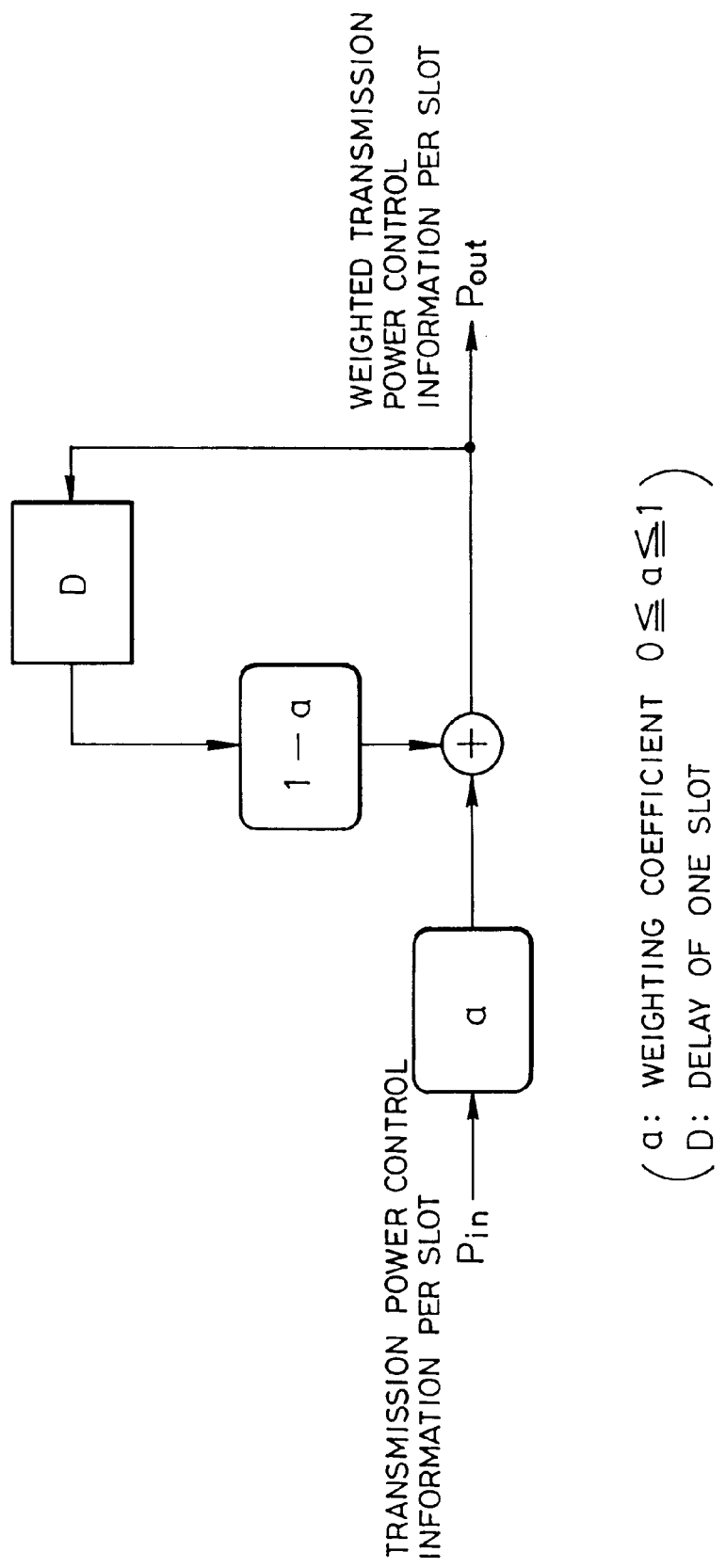
FIG. 8 is a block diagram showing a further embodiment of the spread spectrum receiver according to the present invention.

With reference to FIGS. 8 and 9, this method will be discussed particularly. In this case, a circuit as illustrated in the block diagram in FIG. 8 is employed. In FIG. 8, "a" denotes a weighting coefficient in a range of $0 \leq a \leq 1$, "D" denotes a delay for one slot. When process is performed by the circuit shown in FIG. 8, a relationship between the transmission power control information and the weighted transmission power control information is expressed by:

$Pout[N]=(1-a) \times Pout[N-1]+a \times Pin[N]$ wherein Pin[N] is the transmission power control information in the slot #N and Pout[N] is the weighted transmission power control information in the slot #N.

For example, in case of weighting coefficient a=0.1, the transmission power control information component of each slots are

| influence of #N slot | 10.0% |
|---|---|
| influence of #N-1 slot | 9.0% |
| influence of #N-2 slot | 8.1% |
| influence of #N-3 slot | 7.3% |
| influence of #N-4 slot | 6.6% |
| influence of #N-5 slot | 6.0% |

As can be seen from the above, influence of the immediately preceding slot is greater and influence of past slots become smaller in exponential fashion. Degree of influence is reflected by periodically taking the transmission power control information weighted by the weighting coefficient "a" at a period of M slots sufficiently longer than the transmission power control period, rounding the weighted transmission power control information, for example, and updating the transmission power using the rounded value at the period of M slots.

On the other hand, as still further method, as shown in FIG. 10, the transmission power control information is averaged in a period (for M slots) sufficiently longer than the transmission power control period to control the transmission power by the average value of the transmission power control information derived in the period sufficiently longer than the transmission power control period.

In this case, the degree of influence of each slots becomes the same with each other. For example, in case of the transmission power updating period M,

| influence of #N slot | 1/M × 100% |
|---|---|
| influence of #N-1 slot | 1/M × 100% |
| influence of #N-2 slot | 1/M × 100% |
| influence of #N-3 slot | 1/M × 100% |
| influence of #N-4 slot | 1/M × 100% |
| . | . |
| . | . |
| influence of #N-M + 1 slot | 1/M × 100% |

With the present invention as set forth above, by adjusting the integration period of the delay profile of the reception level in the search range on the basis of the fading period, erroneous detection of path due to fading upon synchronization acquisition can be restricted to improve path detection characteristics and whereby to improve reception characteristics.

The reason is that by integrating the delay profile of the reception level over the fading period, dropping of the reception level due to fading is prevented. Also, when moving speed of the mobile terminal is high, since detection period of the path can be set to short for short fading period to improve follow-up ability for path variation. On the other hand, when the moving speed is low, the accuracy of path detection can be improved by setting the detection period of the path for long fading period.

Secondly, by the present invention, when the instantaneous transmission power control cannot follow-up fading, updating of the instantaneous transmission power is not effective to moderately control the transmission power to make it possible to improve transmission power control characteristics.

The reason is that when the fading period is short to be close to the transmission power control period, judgment is made that the transmission power control cannot follow-up the fading to avoid degradation of the transmission power control characteristics by the instantaneous transmission power control.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A spread spectrum receiver for receiving a spread spectrum signal and demodulating the received signal on the basis of a synchronization phase detected by despreading of the received signal, comprising:

correlation computing means for controlling a phase of a spreading code over a search range and deriving correlation between said received signal and said spreading code;

integrating means for integrating correlation outputs of said correlation computing means in each phase condition of said spreading code over an integration period;

peak detecting means for deriving a synchronization phase by detecting a peak path from output of said integrating means;

demodulation means for demodulating said received signal according to said synchronization phase;

fading period computing means for deriving a relative transmission power on the basis of a transmission power offset with extracting a transmission power control information of a predetermined period transmitted from a counterpart for controlling a transmission power and deriving said integration period depending upon the relative transmission power; and transmission means for deriving the transmission power according to said transmission power information and transmitting the derived transmission power.

2. A spread spectrum receiver as set forth in claim 1, wherein said fading period computing means derives an average value of said relative transmission power over a period corresponding to the fading period sufficiently longer than a transmission power control period for controlling said transmission power and derives said integration period on the basis of said average value.

3. A spread spectrum receiver as set forth in claim 2, wherein said fading period computing means derives positive or negative of said relative transmission power in reference to said average value, derives periods, in respective of which positive sign is continued and negative sign is continued, or negative sign is continued and positive sign is continued, derives an average value of said periods to take as the fading period, and derives said integration period on the basis of said fading period.

4. A spread spectrum receiver as set forth in claim 3, wherein said fading period computing means calculates a spread value of said relative transmission power and sets said integration period to be longer when said spread value is about a value in the case where fading is not caused.

5. A spread spectrum receiver as set forth in claim 3, wherein said fading period computing means sets said integration period shorter when said fading period is short to be close to said transmission power control period.

6. A spread spectrum receiver as set forth in claim 3, wherein said fading period computing means sets said fading period as said integration period when said fading period is sufficiently longer than said transmission power control period and a spread value of said relative transmission power is greater than a spread value when fading is not caused.

7. A spread spectrum receiver as set forth in claim 3, wherein said fading period computing means makes updating of instantaneous transmission power not effective when said fading period is close to said transmission power control period.

8. A spread spectrum receiver as set forth in claim 7, wherein said transmission means does not perform transmission power control when updating of the instantaneous transmission power is not effective.

9. A spread spectrum receiver as set forth in claim 7, wherein said transmission means periodically take said transmission power control information at a period sufficiently longer than said transmission power control period and updates transmission power in a period sufficiently longer than said transmission power control period when updating of said instantaneous transmission power is not effective.

10. A spread spectrum receiver as set forth in claim 7, wherein said transmission means updates said transmission power by calculating past transmission power control information with weighting when updating of said instantaneous transmission power is not effective.

11. A spread spectrum receiver as set forth in claim 7, wherein said transmission means derives an average of said transmission control information in a period sufficiently longer than said transmission power control period and updates said transmission power by the averaged value of said transmission power control information when updating of said instantaneous transmission power is not effective.

12. A transmission power control method in a spread spectrum receiver for receiving a spread spectrum signal and demodulating the received signal on the basis of a synchronization phase detected by despreading of the received signal, comprising:
   correlation computing step of controlling a phase of a spreading code over a search range and deriving correlation between said received signal and said spreading code;
   integrating step of integrating correlation outputs of said correlation computing step in each phase condition of said spreading code over an integration period;
   peak detecting step of deriving a synchronization phase by detecting a peak path from output of said integrating step;
   demodulating step of demodulating said received signal according to said synchronization phase;
   fading period computing step of deriving a relative transmission power on the basis of a transmission power offset with extracting a transmission power control information of a predetermined period transmitted from a counterpart for controlling a transmission power and deriving said integration period depending upon the relative transmission power; and
   transmitting step of deriving the transmission power according to said transmission power information and transmitting the derived transmission power.

13. A transmission power control method as set forth in claim 1, wherein said fading period computing step is executed by deriving an average value of said relative transmission power over a period corresponding to the fading period sufficiently longer than a transmission power control period for controlling said transmission power and deriving said integration period on the basis of said average value.

14. A transmission power control method as set forth in claim 13, wherein said fading period computing step is executed by deriving positive or negative of said relative transmission power in reference to said average value, deriving periods, in respective of which positive sign is continued and negative sign is continued, or negative sign is continued and positive sign is continued, deriving an average value of said periods to take as the fading period, and deriving said integration period on the basis of said fading period.

15. A transmission power control method as set forth in claim 14, wherein said fading period computing step is executed by calculating a spread value of said relative transmission power and sets said integration period to be longer when said spread value is about a value in the case where fading is not caused.

16. A transmission power control method as set forth in claim 14, wherein said fading period computing step is executed by setting said integration period shorter when said fading period is short to be close to said transmission power control period.

17. A transmission power control method as set forth in claim 14, wherein said fading period computing step is executed by setting said fading period as said integration period when said fading period is sufficiently longer than said transmission power control period and a spread value of said relative transmission power is greater than a spread value when fading is not caused.

18. A transmission power control method as set forth in claim 14, wherein said fading period computing step is executed by making updating of instantaneous transmission power not effective when said fading period is close to said transmission power control period.

19. A transmission power control method as set forth in claim 18, wherein said transmission step does not perform transmission power control when updating of the instantaneous transmission power is not effective.

20. A transmission power control method as set forth in claim 18, wherein said transmission step periodically take said transmission power control information at a period sufficiently longer than said transmission power control period and updates transmission power in a period sufficiently longer than said transmission power control period when updating of said instantaneous transmission power is not effective.

21. A transmission power control method as set forth in claim 18, wherein said transmission step updates said transmission power by calculating past transmission power control information with weighting when updating of said instantaneous transmission power is not effective.

22. A transmission power control method as set forth in claim 18, wherein said transmission step derives an average of said transmission control information in a period sufficiently longer than said transmission power control period and updates said transmission power by the averaged value of said transmission power control information when updating of said instantaneous transmission power is not effective.

* * * * *